US012737946B2

(12) United States Patent
Odagiri

(10) Patent No.: US 12,737,946 B2
(45) Date of Patent: Sep. 15, 2026

(54) INFORMATION PROCESSING APPARATUS AND METHOD OF CONTROLLING INFORMATION PROCESSING APPARATUS

(71) Applicant: CANON KABUSHIKI KAISHA, Tokyo (JP)

(72) Inventor: Jun Odagiri, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/791,488

(22) Filed: Aug. 1, 2024

(65) Prior Publication Data

US 2025/0069212 A1 Feb. 27, 2025

(30) Foreign Application Priority Data

Aug. 25, 2023 (JP) ................................ 2023-137401

(51) Int. Cl.
*G06T 7/00* (2017.01)
*G06F 3/0482* (2013.01)
*G06T 11/60* (2026.01)

(52) U.S. Cl.
CPC .......... *G06T 7/0002* (2013.01); *G06F 3/0482* (2013.01); *G06T 11/60* (2013.01); *G06T 2200/24* (2013.01); *G06T 2207/10024* (2013.01); *G06T 2207/10148* (2013.01); *G06T 2207/30168* (2013.01)

(58) Field of Classification Search
CPC ... G06T 7/0002; G06T 11/60; G06T 2200/24; G06T 2207/10024; G06T 2207/10148; G06T 2207/30168; G06F 3/0482
USPC .......................................................... 348/125
See application file for complete search history.

(56) References Cited

U.S. PATENT DOCUMENTS

| | | | | |
|---|---|---|---|---|
| 12,091,035 B2 * | 9/2024 | Fujiwara | ............... | B60W 30/06 |
| 2013/0063563 A1 * | 3/2013 | Pulla | .................. | G01B 9/02023 348/46 |
| 2013/0109915 A1 * | 5/2013 | Krupnik | ................. | A61B 1/045 600/109 |
| 2021/0281748 A1 * | 9/2021 | Nogami | ................. | G06N 20/00 |

FOREIGN PATENT DOCUMENTS

JP 2022-075510 A 5/2022

* cited by examiner

*Primary Examiner* — Thai Q Tran
*Assistant Examiner* — Nienru Yang
(74) *Attorney, Agent, or Firm* — Carter, DeLuca & Farrell LLP

(57) ABSTRACT

An information processing apparatus obtains a plurality of captured images in which an image capturing target object is captured; displays the plurality of captured images in a display form that corresponds to a determination result of an image quality of each of the plurality of captured images; and sets an arrangement of the plurality of captured images in the display unit. In the setting, designation of an image capturing start position of the image capturing target object is received and designation of an image capturing order of the image capturing target object is received.

15 Claims, 12 Drawing Sheets

F I G. 1
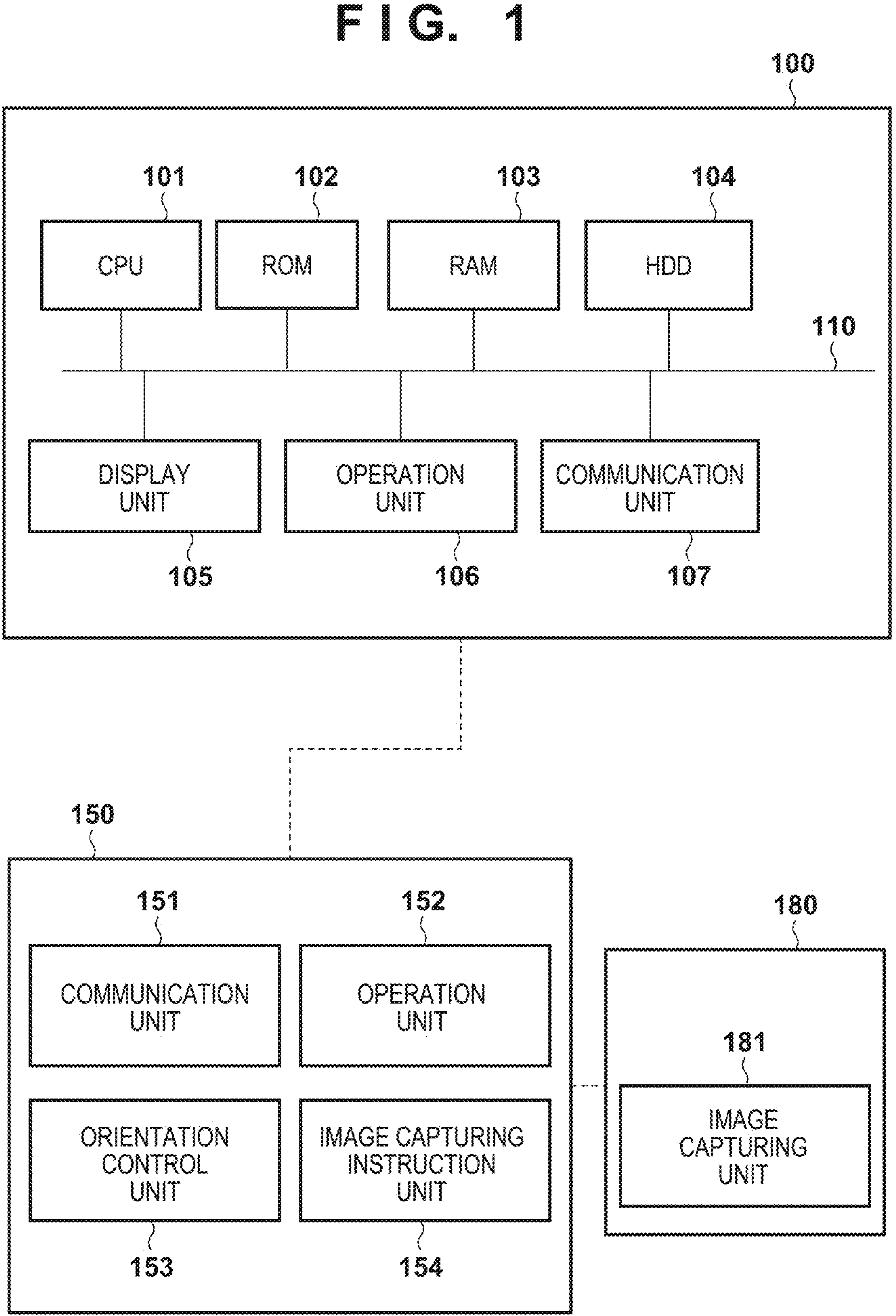

START
IMAGE CAPTURING PROCESSING
S201
OBTAIN CAPTURED IMAGE
S202
DETERMINE IMAGE CAPTURING CONDITION
S203
S204
PREDETERMINED IMAGE CAPTURING CONDITION MET?
NO
YES
DETERMINE IMAGE QUALITY
S205
S206
ALL IMAGES DETERMINED?
NO
YES
S207
IS THERE NG CAPTURED IMAGE?
NO
YES
DISPLAY TABLE OF DETERMINATION RESULTS
S208
END

320

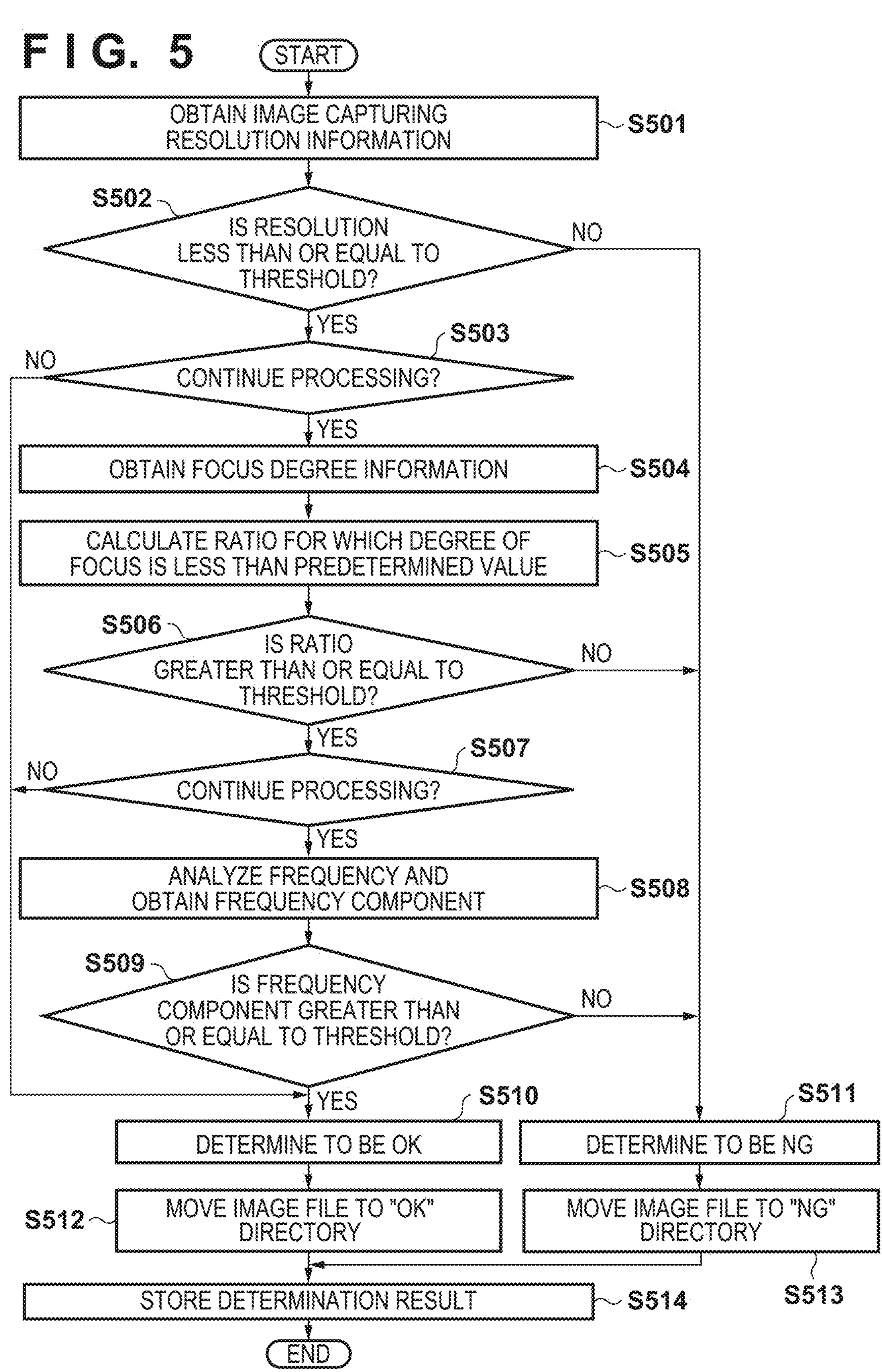
F I G. 5
START
OBTAIN IMAGE CAPTURING RESOLUTION INFORMATION
S501
S502
IS RESOLUTION LESS THAN OR EQUAL TO THRESHOLD?
NO
YES
S503
NO
CONTINUE PROCESSING?
YES
OBTAIN FOCUS DEGREE INFORMATION
S504
CALCULATE RATIO FOR WHICH DEGREE OF FOCUS IS LESS THAN PREDETERMINED VALUE
S505
S506
IS RATIO GREATER THAN OR EQUAL TO THRESHOLD?
NO
YES
S507
NO
CONTINUE PROCESSING?
YES
ANALYZE FREQUENCY AND OBTAIN FREQUENCY COMPONENT
S508
S509
IS FREQUENCY COMPONENT GREATER THAN OR EQUAL TO THRESHOLD?
NO
YES
S510
S511
DETERMINE TO BE OK
DETERMINE TO BE NG
S512
MOVE IMAGE FILE TO "OK" DIRECTORY
MOVE IMAGE FILE TO "NG" DIRECTORY
S513
STORE DETERMINATION RESULT
S514
END

FIG. 7

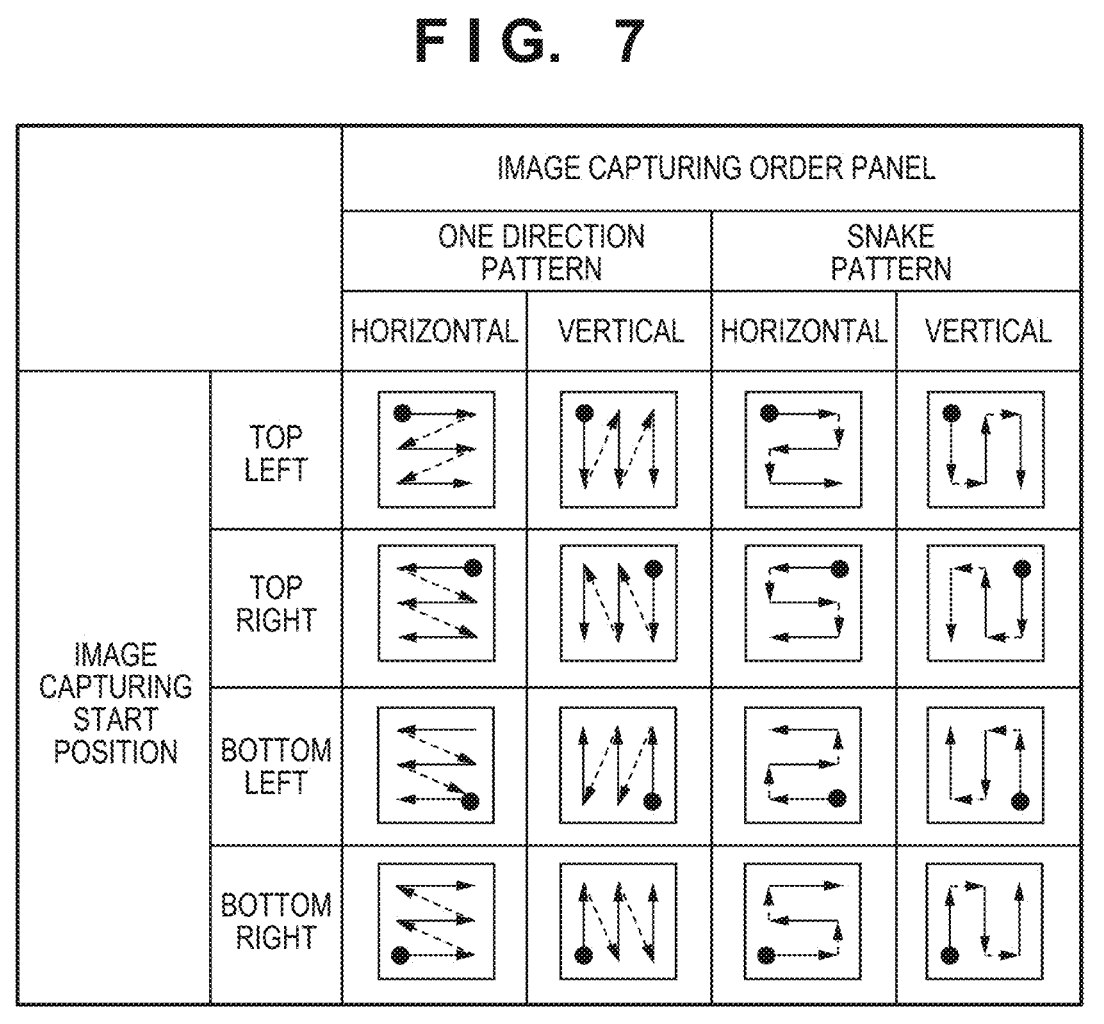

| | | IMAGE CAPTURING ORDER PANEL | | | |
|---|---|---|---|---|---|
| | | ONE DIRECTION PATTERN | | SNAKE PATTERN | |
| | | HORIZONTAL | VERTICAL | HORIZONTAL | VERTICAL |
| IMAGE CAPTURING START POSITION | TOP LEFT | | | | |
| | TOP RIGHT | | | | |
| | BOTTOM LEFT | | | | |
| | BOTTOM RIGHT | | | | |

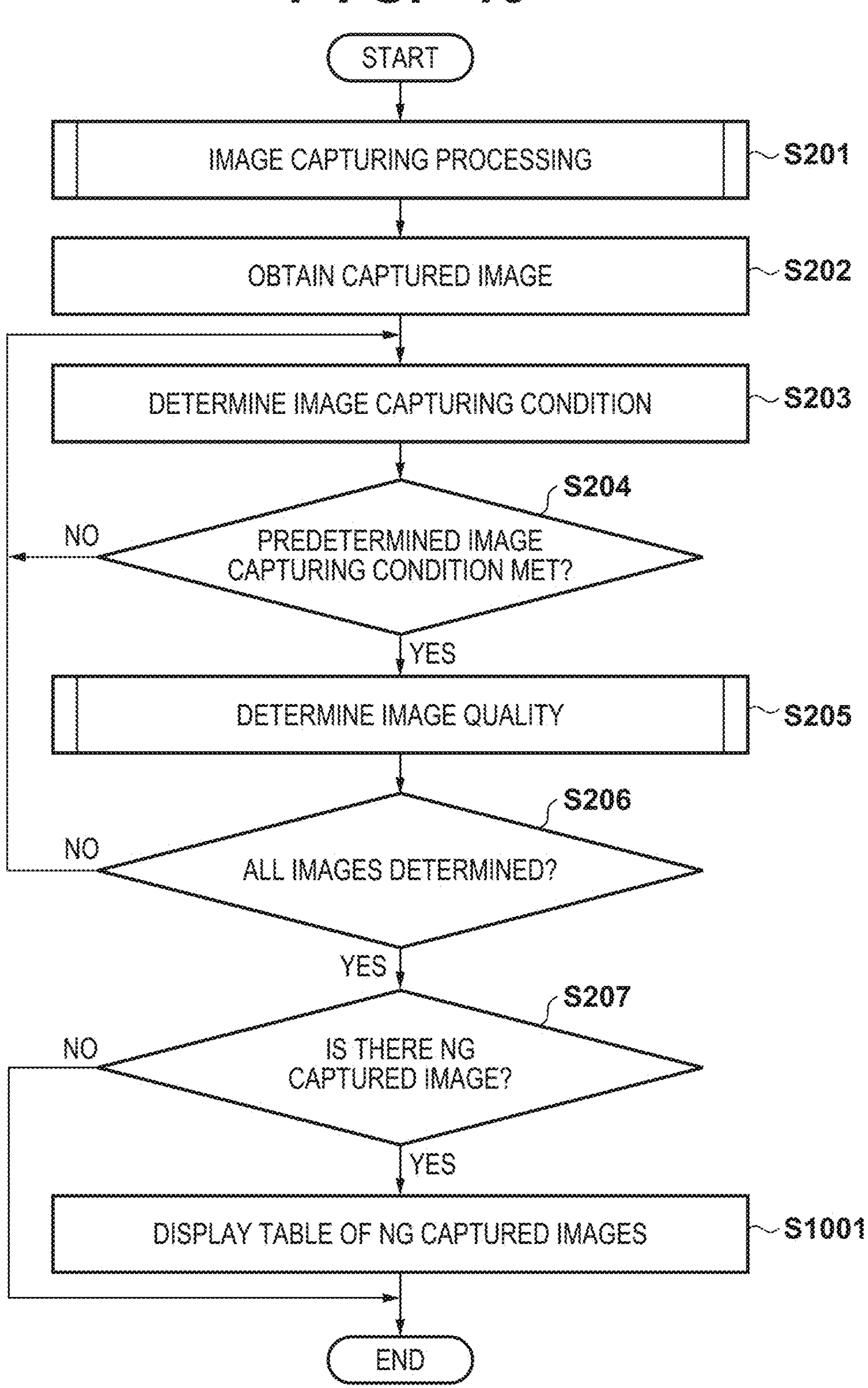
F I G. 10
START
IMAGE CAPTURING PROCESSING
S201
OBTAIN CAPTURED IMAGE
S202
DETERMINE IMAGE CAPTURING CONDITION
S203
S204
PREDETERMINED IMAGE CAPTURING CONDITION MET?
NO
YES
DETERMINE IMAGE QUALITY
S205
S206
ALL IMAGES DETERMINED?
NO
YES
S207
IS THERE NG CAPTURED IMAGE?
NO
YES
DISPLAY TABLE OF NG CAPTURED IMAGES
S1001
END

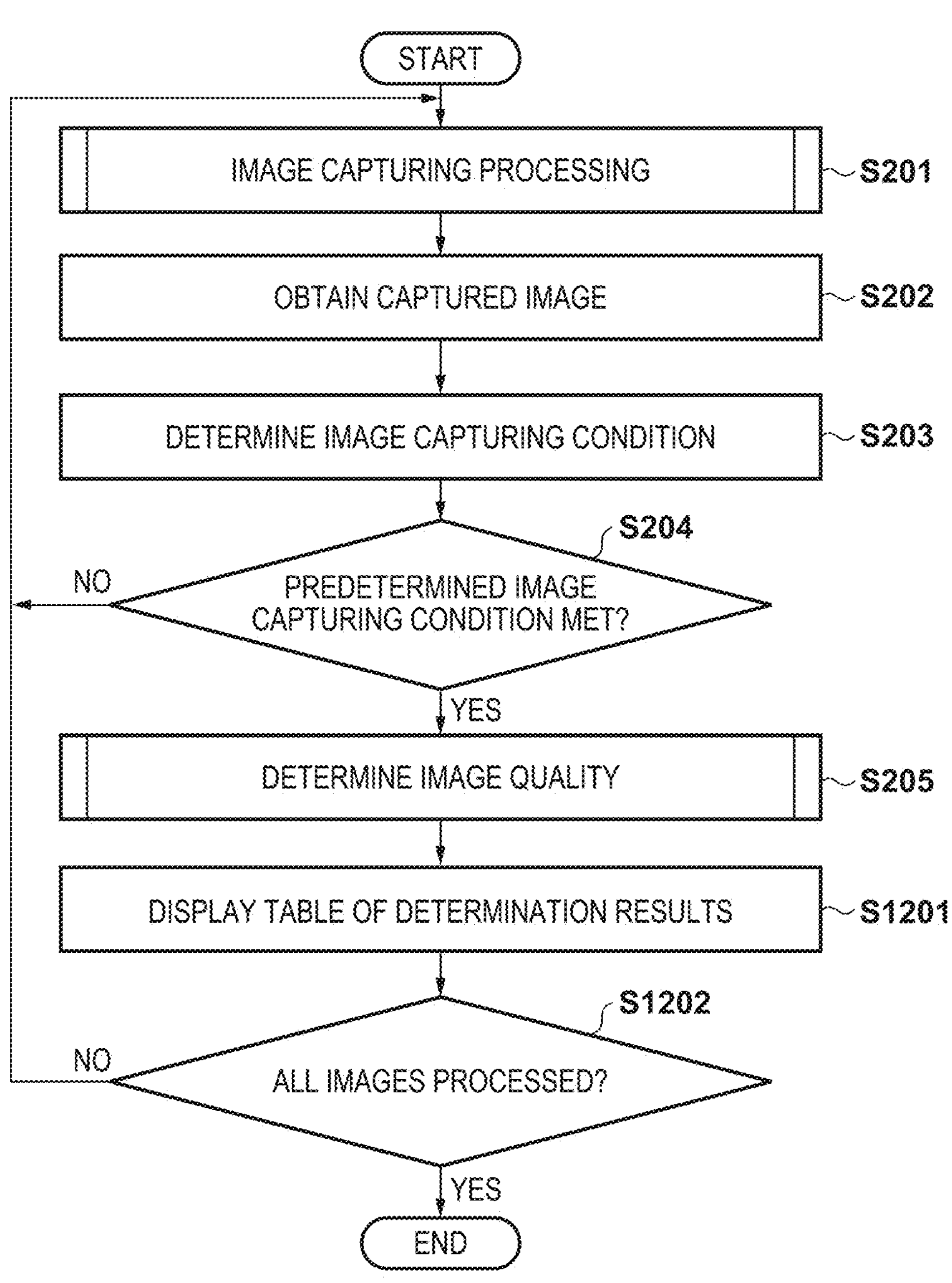
F I G. 12
START
IMAGE CAPTURING PROCESSING
S201
OBTAIN CAPTURED IMAGE
S202
DETERMINE IMAGE CAPTURING CONDITION
S203
S204
NO
PREDETERMINED IMAGE CAPTURING CONDITION MET?
YES
DETERMINE IMAGE QUALITY
S205
DISPLAY TABLE OF DETERMINATION RESULTS
S1201
S1202
NO
ALL IMAGES PROCESSED?
YES
END

INFORMATION PROCESSING APPARATUS AND METHOD OF CONTROLLING INFORMATION PROCESSING APPARATUS

BACKGROUND OF THE INVENTION

Field of the Invention

The present disclosure relates to a technique for determining the quality of a captured image.

Description of the Related Art

In recent years, inspection in which captured images in which infrastructure is captured are used has been performed. In inspection in which captured images are used in order to detect defects such as cracks, the captured images need to satisfy a predetermined image quality (be sharp and in focus). If a captured image does not satisfy the quality, it may need to be recaptured. If image recapturing needs to be performed on a later date, a great deal of effort will be required, and so, there is a need for a technique for promptly determining at the time of initial image capturing whether a captured image satisfies a predetermined image quality (i.e., whether image recapturing is necessary). Japanese Patent Laid-Open No. 2022-75510 (Patent Literature 1) discloses determining whether a captured image satisfies a predetermined image quality based on an image capturing resolution as a result of analyzing a degree of focus and a frequency and classifying and storing the captured image into an OK directory or an NG directory according to the determination result.

However, the technique disclosed in the above Patent Literature 1 only indicates that a captured image stored in the NG directory is an image that needs to be recaptured. Therefore, it is difficult for a user to adequately ascertain what portion of a structure is captured in a captured image determined to be NG.

SUMMARY OF THE INVENTION

According to one aspect of the present invention, an information processing apparatus comprises: one or more memories storing instructions; and one or more processors executing the instructions to: cause obtainment of a plurality of captured images in which an image capturing target object is captured; cause a display unit to display the plurality of captured images in a display form that corresponds to a determination result of an image quality of each of the plurality of captured images; and allow setting of an arrangement of the plurality of captured images in the display unit, wherein in the setting, designation of an image capturing start position of the image capturing target object is received and designation of an image capturing order of the image capturing target object is received.

The present disclosure makes it possible for a user to more adequately ascertain a state of a captured image.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a diagram illustrating a configuration of an image capturing system and each apparatus.

FIG. 5 is a detailed flowchart of image quality determination processing (step S205).

FIG. 7 is a diagram illustrating an example of an image capturing order panel.

FIG. 10 is a flowchart for explaining the operation of an information processing apparatus (first variation).

FIG. 12 is a flowchart for explaining the operation of an information processing apparatus (second variation).

DESCRIPTION OF THE EMBODIMENTS

Figure 2:
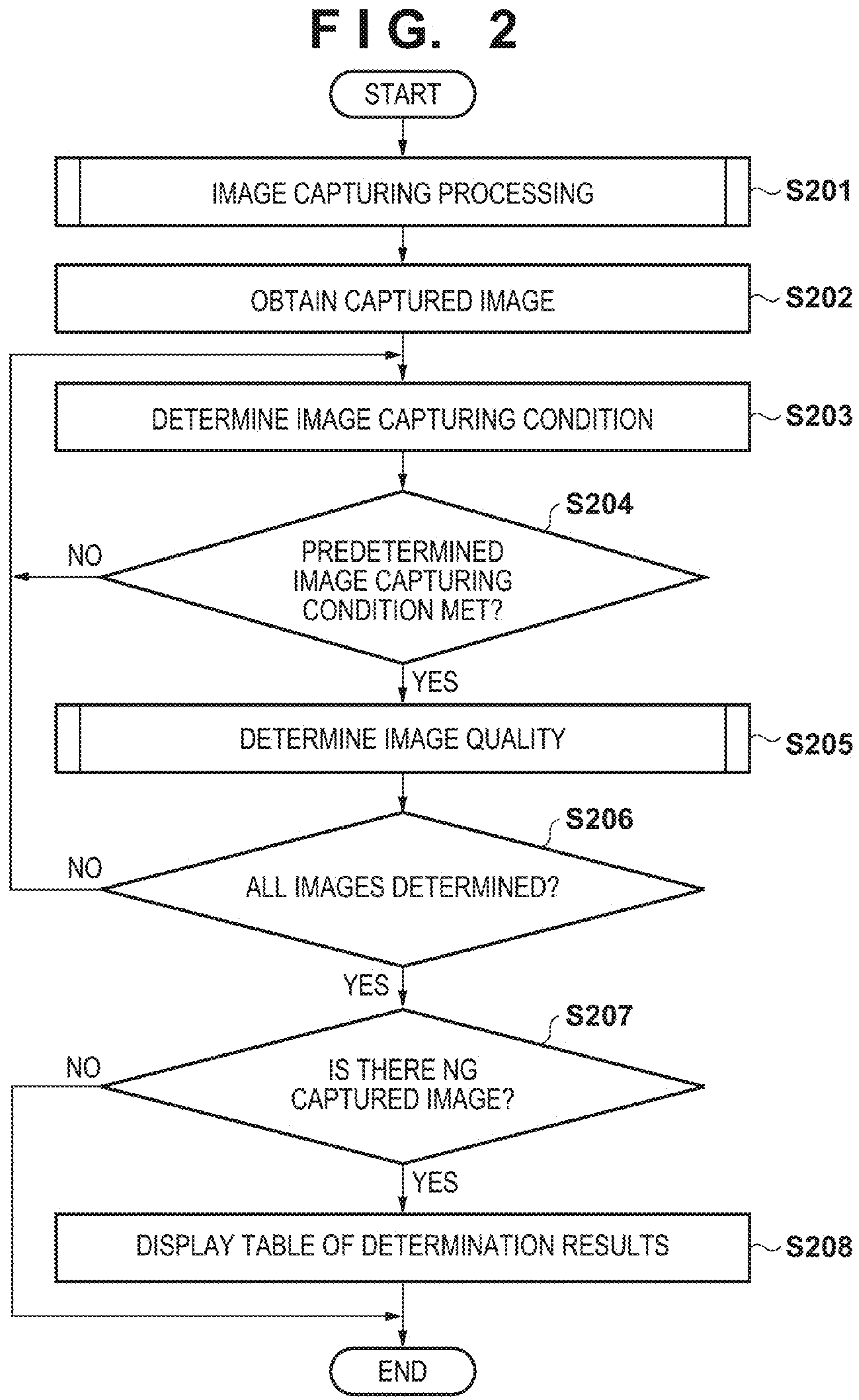
FIG. 2 is a flowchart for explaining the operation of an information processing apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

A first embodiment of an information processing apparatus according to the present disclosure will be described below using an information processing apparatus for obtaining a captured image of an image capturing target object (structure) by controlling an image capturing apparatus as an example.

<System Configuration and Apparatus Configuration>

FIG. 1 is a diagram illustrating a configuration of an image capturing system and a hardware configuration of each apparatus. The image capturing system is a system for performing inspection (also referred to as image inspection) of a structure based on a captured image in which the structure is captured. In particular, it determines the quality of (necessity of recapturing) a captured image and presents the determination result to a user. Examples of a structure include a bridge, a tunnel, a road, a building, a dam, an embankment, electrical equipment, and the like. The image capturing system is configured to include an information processing apparatus 100, an image capturing assistance apparatus 150, and an image capturing apparatus 180, which are connected so as to be capable of communication.

The information processing apparatus 100 is an apparatus for controlling the entirety of image capturing processing of the image capturing system. The information processing apparatus 100 includes a central processing unit (CPU) 101, a read-only memory (ROM) 102, a random access memory (RAM) 103, and a hard disk drive (HDD) 104. The information processing apparatus 100 further includes a display unit 105, an operation unit 106, and a communication unit 107.

The CPU 101 performs computation, logical determination, and the like for various kinds of processing by executing a program and thus controls each component connected to a system bus 110. The ROM 102 is a program memory and stores programs for control by the CPU 101, which includes various processing procedures to be described later. The RAM 103 is used as a temporary storage region such as a main memory and a work area of the CPU 101. The program memory may be realized by loading a program into the RAM 103 from an external storage apparatus or the like connected to the information processing apparatus 100.

The HDD 104 is a storage apparatus for storing electronic data, such as image data according to the present embodiment, and programs. An external storage apparatus may be used to serve a similar role. Here, the external storage apparatus can be realized by, for example, a medium (storage medium) and an external storage drive for realizing access to the medium. As such a medium, for example, a flexible disk (FD), a CD-ROM, a DVD, a USB memory, an MO disk, a flash memory, and the like are known. The external storage apparatus may be a server apparatus or the like connected by a network.

The display unit 105 is, for example, a liquid crystal display (LCD), an organic EL display (OLED), or the like and is a device for outputting an image to a display screen. The display unit 105 may be an external apparatus connected to the information processing apparatus 100 by wire or wirelessly. The operation unit 106 is a device such as a keyboard and a mouse and receives various operations by the user.

The communication unit 107 performs bidirectional communication with another information processing apparatus, communication apparatus, external storage apparatus, and the like by wire or wirelessly according to a known communication technology. The communication unit 107 may be configured by, for example, a chip or an antenna for performing wireless communication and performs communication by a wireless communication method such as a public wireless network (e.g., 4G or 5G), a wireless LAN, or Bluetooth®.

The image capturing assistance apparatus 150 is a head apparatus capable of changing an image capturing position and an image capturing direction based on control from the information processing apparatus 100. The image capturing apparatus 180 to be described later is mounted on the image capturing assistance apparatus 150. The image capturing assistance apparatus 150 includes a communication unit 151, an operation unit 152, an orientation control unit 153, and an image capturing instruction unit 154.

The communication unit 151 communicates with the information processing apparatus 100 by wire or wirelessly and performs control of a position and an orientation (image capturing direction and position) and image capturing instruction according to instructions from the information processing apparatus. The communication unit 151 may be configured by, for example, a chip or an antenna for performing wireless communication and performs communication by a wireless communication method such as a public wireless network (e.g., 4G or 5G), a wireless LAN, or Bluetooth®.

The operation unit 152 includes a touch panel and buttons and receives various operations by the user. The orientation control unit 153 changes the orientation (image capturing direction and position) of the head apparatus such that an image capturing region of a designated inspection target subject can be imaged. The image capturing instruction unit 154 controls the image capturing apparatus 180, which has been set in the image capturing direction and position changed by the orientation control unit 153, so as to perform image capturing.

The image capturing apparatus 180 is an apparatus that performs image capturing based on image capturing instruction information received from the information processing apparatus 100 via the image capturing assistance apparatus 150. For example, the image capturing apparatus 180 includes an image capturing unit 181 including an image capturing optical system and an image capturing element. The image capturing element includes, for example, a full image plane phase difference image capturing sensor and records focus degree information (defocus value) at each pixel position in the captured image. The focus degree information will be described later with reference to FIGS. 9A to 9C. Here, the focus degree information is data representing a spatial (two-dimensional) distribution of defocus values in an image capturing range. In the following description, data representing a spatial distribution of defocus values is also referred to as a defocus map. A defocus value is an amount of shift in focus from a distance at which an optical system of the image capturing apparatus 180 is focused. That is, the defocus map indicates a defocus value for each pixel of an image as a spatial distribution.

Each pixel of the full image plane phase difference image capturing sensor of the image capturing apparatus 180 includes two photoelectric conversion units, and these are assumed to be subpixel A and subpixel B. In the full image plane phase difference image capturing sensor, it is assumed that subpixels A and B, which are regularly arranged on a two-dimensional plane, output an image A and an image B, respectively, as parallax images. In addition, an A+B image obtained by adding the image A and the image B are recorded as a recorded still image. Defocus values are calculated based on a phase difference between these parallax images. Here, description will be given using a configuration in which defocus values are derived in pixel units as an example, but defocus values may be derived for each predetermined region such as block units including a plurality of pixels (e.g., 5 pixels×5 pixels).

<Overall Operation of Apparatus>

FIG. 2 is a flowchart for explaining the operation of the information processing apparatus 100. The flowchart is started by the CPU 101 of the information processing apparatus 100 executing a program.

In step S201, the CPU 101 performs image capturing processing. The image capturing processing is processing in which the information processing apparatus 100 performs image capturing by controlling the image capturing assistance apparatus 150 and the image capturing apparatus 180.

Figures 3A, 3B:
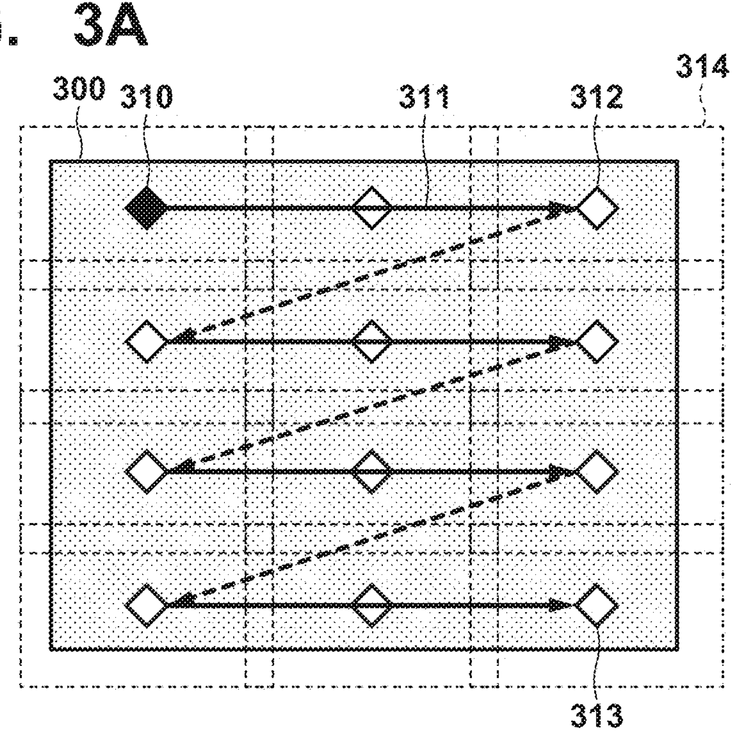
FIGS. 3A and 3B are diagrams illustrating image capturing control for when capturing a structure.

FIGS. 3A and 3B are diagrams illustrating image capturing control for when capturing a structure. In the image capturing processing in step S201, as illustrated in FIG. 3A, image capturing is performed by sequentially moving along an image capturing direction movement path 311 (given movement pattern) indicated by arrows across a structure 300 (indicated by halftone dots) to be imaged. Specifically, image capturing is started from an image capturing start position 310 (indicated by a black diamond), and image capturing is performed sequentially at a plurality of image capturing positions 312 (indicated by white diamonds) according to the movement path 311. Then, when image capturing at an image capturing end position 313 is completed, the image capturing processing ends.

In FIG. 3A, an image capturing range 314 of each of the captured images is indicated by a broken line, and a case where image capturing is performed such that the image capturing ranges of adjacent captured images slightly overlap is assumed. FIG. 3B illustrates a plurality of captured images 320 captured using the above method arranged in a tiled manner in a positional relationship that substantially corresponds to that of FIG. 3A. For example, it is possible to easily perform arrangement in a tiled manner by performing arrangement in chronological order, image capturing time order, or file name order. A tiled arrangement includes performing two-dimensional arrangement along each of a row direction and a column direction, which are orthogonal to each other. However, configuration may be such that two-dimensional arrangement is performed along only one of the row direction and the column direction. For example, if image capturing such as that illustrated in FIG. 3A is performed, when performing tiled arrangement, arrangement is performed along a horizontal direction (row direction) but arrangement does not necessarily need to be performed along a vertical direction (column direction).

In step S202, the CPU 101 obtains a captured image. Specifically, it obtains one or more captured images of a target to be processed in subsequent steps S203 to S205.

In steps S203 to S205, processing for determining whether a captured image satisfies each of an image capturing condition and an image quality is performed on each of the one or more captured images obtained in step S202.

In step S203, the CPU 101 obtains image information of the inputted image and stores the image information in the HDD 104. Then, the CPU 101 performs image capturing condition determination processing for determining an image capturing condition for when the captured image was captured from the obtained image information.

In the image capturing condition determination processing (step S203), if the determined image capturing condition of the captured image does not meet a predetermined image capturing condition (does not satisfy a predetermined image capturing condition), it is recorded in the HDD 104 that the captured image currently being processed is "outside the image capturing condition". That is, it is possible to determine whether image recapturing is necessary according to the image capturing condition of the captured image. By performing determination processing in which the image capturing condition is used, it is possible to determine a captured image that needs to be recaptured without performing image quality determination processing of step S205 to be described later. Further, by performing the image capturing condition determination processing of step S203, which is lower in load than the image quality determination processing of step S205 to be described later, in a preceding stage, it is possible to reduce processing time.

As an example of the image capturing condition to be used in the determination in step S203, an aperture value (f-number) can be used. It is desirable that an image to be used for image inspection be an image in which the depth of field is deep and the effect of an out-of-focus state caused by diffraction is small. Therefore, a range of conditions is set for the value of the aperture value for when an image was captured. That is, regarding a captured image captured at an aperture value other than that in a predetermined range or of a predetermined value, it is determined that the captured image should not be used for image inspection and that image recapturing is necessary.

As another example of the image capturing condition to be used for determination in step S203, an ISO value (sensitivity) representing a light capturing capability can be used. If noise is included in an image, a defect will be buried in the noise, and so, it is desirable that an image to be used for image inspection be an image with little noise. Therefore, a condition is set for the ISO value for when an image was captured. That is, regarding a captured image captured at an ISO value other than that in a predetermined range or of a predetermined value, it is determined that the captured image should not be used for image inspection and that image recapturing is necessary.

As yet another example of the image capturing condition to be used in the determination in step S203, a distance to a subject can be used. If the distance to a subject is too long, the image resolution will be relatively low, and it may be not be possible to detect fine defects. Therefore, a condition is set for the distance to a subject for when an image was captured. That is, regarding a captured image captured at the distance to a subject other than that in a predetermined range or of a predetermined value, it is determined that the captured image should not be used for image inspection and that image recapturing is necessary.

A configuration may be taken so as to use a plurality of image capturing conditions in the determination in step S203, and a condition may set for each of a plurality of attributes.

In step S204, the CPU 101 determines whether to transition to processing of step S205 for the processing target image, based on a result of the determination of step S203. If it is determined that the captured image meets the predetermined image capturing condition (Yes), the processing transitions to step S205, and if it is determined that the captured image does not meet the predetermined image capturing condition (No), the processing transitions to step S203. In the case of transitioning to step S203, an unprocessed captured image to be processed next is selected.

In step S205, the CPU 101 performs image quality determination processing for determining the image quality of the captured image and stores a determination result in the HDD 104. Here, the image quality means a degree of focus and a degree of occurrence of blurring in the captured image (the smaller the degree of occurrence, the higher the image quality). The image quality determination processing will be described later in detail with reference to FIG. 5. In the image quality determination processing in step S205, the image quality is determined by using focus degree information indicating a degree of focus for each partial region in the captured image, for example. For example, the CPU 101 outputs information "OK" indicating that the image quality satisfies the condition or information "NG" indicating that the image quality does not satisfy the condition in association with a determination target captured image.

The focus degree information is used, because there is a high risk that image processing necessary for inspection, such as defect detection and compositing, cannot be properly implemented for an image that is not properly focused on an inspection surface, and the image should not be used for inspection. A shift in a focus position may occur, for example, when a gust of wind causes the image capturing assistance apparatus 150 or the image capturing apparatus 180 to move during image capturing processing. Further, it may also occur due to an obstacle (e.g., another worker or bird) entering a ranging point of the image capturing apparatus, between the image capturing apparatus and the inspection target surface, and control for autofocusing on that obstacle being performed. Here, an example in which the image quality is determined using the focus degree information has been described, but determination may be made based on, for example, a resolution indicated by the number of pixels per unit length of an inspection surface. Compositing here refers to processing for combining a plurality of images with each other by aligning their respective positions so as to reproduce a positional relationship in physical coordinates in a simulative manner. That is, an image generated by compositing is an image representing the entire inspection target, and a plurality of images are used. For example, compositing here may be processing for joining a plurality of images with each other. Alternatively, compositing may be processing for replacing a region of another image that overlaps with a region of a portion of a given image with the region of the portion of the given image. Alternatively, compositing may be processing for blending (e.g., processing for averaging) overlapping portions of two images. Further, compositing may be processing in which these have been combined.

In step S206, the CPU 101 determines whether the processing of steps S203 to S205 has been completed for all the captured images inputted in step S202. If the processing has been completed for all the captured images (Yes), the processing transitions to step S207, and if the processing has not been completed (No), the processing transitions to step S203. In the case of transitioning to step S203, an unprocessed captured image to be processed next is selected.

In step S207, the CPU 101 determines whether an image capturing condition determination result "outside the image capturing condition" or an image quality determination result "NG" is included in the determination information stored in the HDD 104. If it is included (Yes), the processing transitions to step S208, and if it is not included (No), the processing ends.

In step S208, the CPU 101 performs display control for displaying a table of determination results on the display unit 105. In the display of a table of determination results, display is performed such that the user can easily ascertain a position of a captured image that needs to be recaptured that is relative to a structure. In addition, the reason why image recapturing is necessary is presented to the user based on the results of determining the image capturing condition and the image quality stored in steps S203 and S205. The display of a table of determination results will be described later in detail with reference to FIG. 6.

<Detailed Operations in Image Capturing Processing (Step S201)>

Figure 4:
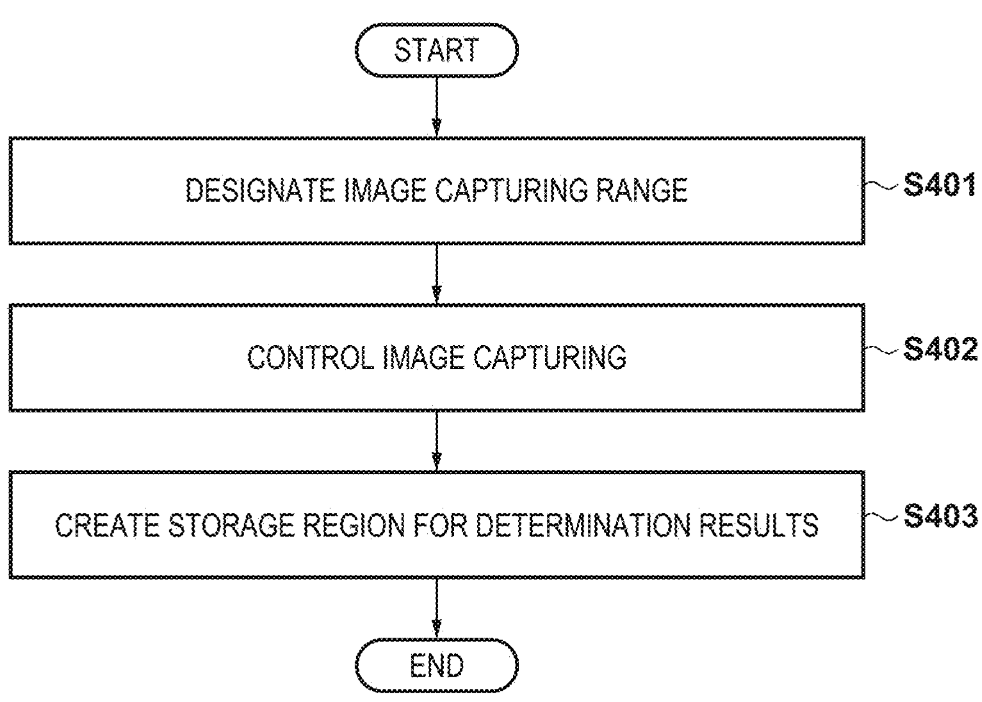
FIG. 4 is a detailed flowchart of image capturing processing (step S201).

FIG. 4 is a detailed flowchart of the image capturing processing.

In step S401, the information processing apparatus 100 receives designation of the entire image capturing range (range including the structure 300 of FIG. 3A) from the user. For example, the information processing apparatus 100 receives, from the user, two points on a diagonal of the structure 300 (e.g., top left vertex position and bottom right vertex position of the structure 300) and designation of an image capturing direction movement pattern. The movement pattern will be described later with reference to FIG. 7. The information processing apparatus 100 calculates the number of captured images (total number of times of image capturing), the number for turnback (number of times of image capturing for each row (=horizontal direction)), and the image capturing position of each captured image based on the received information.

For example, assume that a structure to be inspected is width 3.0 m× height 3.0 m, and a range that can be captured in one captured image is width 1.2 m×height 0.8 m. Further, as illustrated in FIG. 3A, it is assumed that the image capturing start position 310 is top left of the structure and the image capturing end position 313 is bottom right (position on a diagonal of the image capturing start position) of the structure. In this case, considering overlapping regions of each captured image, 3 columns×4 rows of 12 captured images are necessary, and the number for turnback is calculated to be "3". Regarding the movement path 311, image capturing is performed in the horizontal direction, and when number of times of image capturing reaches the number for turnback "3", movement is made downward by one row, and image capturing is performed again. The above-described information at the time of image capturing and calculation result are stored in the HDD 104 and can be used when performing image capturing control of step S402 to be described later and determination result table display of step S208.

In step S402, the information processing apparatus 100 controls the image capturing assistance apparatus 150 (head apparatus) and, based on the information at the time of image capturing and the calculation result stored in the HDD 104, controls the image capturing apparatus 180 to perform image capturing. Specifically, the information processing apparatus 100 performs control for changing the orientation (direction and position) of the image capturing assistance apparatus 150. Then, the information processing apparatus 100 controls the image capturing apparatus 180 to adjust focus by, for example, an auto-focus (AF) function in which a central portion of the image capturing range is assumed as a ranging point, and transmits an image capturing instruction to the image capturing apparatus 180 such that image capturing is performed with the completion of AF. The information processing apparatus 100 starts image capturing control at the next image capturing position in response to control of the image capturing assistance apparatus 150 or a notification of completion of image capturing at a respective image capturing position transmitted from the image capturing apparatus 180. The information processing apparatus 100 repeats such processing until image capturing is completed at all image capturing positions. When image capturing is completed at all image capturing positions, the image capturing processing ends. Here, a configuration is such that the processing of the above-described steps S401 and S402 is performed by the information processing apparatus 100, but a configuration may be such that the image capturing assistance apparatus 150 receives designation from the user and performs the above-described processing.

In step S403, the information processing apparatus 100 creates a storage region for storing an image for which the determination processing (steps S203 to S205) to be subsequently performed has been completed. For example, a sub-directory named "OK" and a sub-directory named "NG" are created in a directory in which captured images obtained by performing image capturing in step S402 are stored.

<Detailed Operations in Image Quality Determination Processing (Step S205)>

FIG. 5 is a detailed flowchart of image quality determination processing (step S205). Here, regarding image quality determination, it is assumed that determination is performed in the order of "image capturing resolution determination", "focus degree determination", and "blur determination".

In step S501, the CPU 101 obtains information related to an image capturing resolution of a captured image. Here, the image capturing resolution is a per-pixel length (e.g., in units of mm) of a captured image (the smaller the value of the image capturing resolution, the higher the resolution, and fine defects (e.g., cracks) can be detected in image inspection) on a surface of a structure. For example, an image capturing resolution is calculated from an image size (number of pixels vertically and horizontally) of a captured image, the size of the image capturing sensor, and a distance to an image capturing surface (distance from the image capturing unit 181 to a structure). The distance to an image capturing surface is obtained by obtaining a distance to a subject when adjusting focus at a position of a ranging point of the subject.

In step S502, the CPU 101 determines whether the value of the image capturing resolution obtained in step S501 is less than or equal to a predetermined threshold (i.e., high resolution). If it is less than or equal to the threshold (Yes), the processing transitions to step S503, and if it is greater than the threshold (i.e. low resolution) (No), the processing transitions to step S511. This makes it possible to determine whether an inspection image satisfies the image capturing resolution necessary for image inspection. If the image capturing resolution is greater than the threshold, even if the image quality is good (in focus and not blurred), the image is unsuitable for image inspection and thus is determined to be NG. Setting of the threshold for image capturing resolution determination will be described later with reference to FIG. 8.

In step S503, the CPU 101 determines whether to continue and execute processing subsequent to image capturing resolution determination (i.e., focus degree determination and blur determination). In the case of continuing (Yes), the processing transitions to step S504, and in the case of not continuing (No), the processing transitions to step S510. Setting of whether to continue processing subsequent to image capturing resolution determination will be described later with reference to FIG. 8.

In step S504, the CPU 101 obtains focus degree information included in the processing target image. Here, the focus degree information is a defocus map (information in which a defocus value for each region of the captured image is recorded) which is information to be obtained together with an image captured by an image capturing apparatus that includes a total image plane phase difference image capturing sensor. Regarding obtainment of defocus values, it is also possible to use another known technique. For example, a configuration may be taken so as to obtain defocus values using parallax images captured by a stereo camera or the like.

In step S505, the CPU 101 calculates a surface area ratio of an in-focus region (region in which focus is aligned) to the entire region of the captured image using the focus degree information obtained in step S504. For example, a defocus value is obtained by quantifying (positive value when the focus is shifted to the front, and negative value when the focus is shifted to the back) the amount of front and back shift in focus on an object for each pixel (or for each partial region) of an image. Therefore, the surface area ratio of a region in which the absolute value of the defocus value is less than a predetermined value is calculated.

In step S506, the CPU 101 determines whether the surface area ratio calculated in step S505 is greater than or equal to a predetermined threshold. If the surface area ratio is greater than or equal to the predetermined threshold (Yes), the processing is transitioned to step S507, and if the surface area ratio is less than the threshold (No), the processing transitions to step S511. Setting of the threshold for focus degree determination will be described later with reference to FIG. 8.

In step S507, the CPU 101 determines whether to continue and execute processing subsequent to focus degree determination (i.e., blur determination). In the case of continuing (Yes), the processing transitions to step S508, and in the case of not continuing (No), the processing transitions to step S510. Setting of whether to continue processing other than image capturing resolution determination will be described later with reference to FIG. 8.

In step S508, the CPU 101 performs frequency analysis processing on the captured image and obtains a frequency component value. For example, a horizontal frequency component and a vertical frequency component are calculated using wavelet transform. Then, an average value of the obtained frequency components in two directions is calculated and is assumed as the frequency component value.

In step S509, the CPU 101 determines whether the frequency component value calculated in step S508 is greater than or equal to a predetermined threshold. If it is greater than or equal to the predetermined threshold (Yes), the processing is transitioned to step S510, and if it is less than the threshold (No), the processing transitions to step S511. That is, if the frequency component value is greater than or equal to the threshold, it indicates that the captured image currently being processed has many high-frequency components (=many edge regions), and so, it is determined that there are few out-of-focus regions. Meanwhile, if the frequency component value is less than the threshold, it is determined that there are many out-of-focus regions. In the flowchart of FIG. 5, focus degree determination (step S505) has already been performed, and so, it is possible to determine that an out-of-focus state is caused not by the focus not aligning but by occurrence of blurring. Regarding the threshold for blur determination will be described later with reference to FIG. 8.

As described above, by performing blur determination using frequency analysis after focus degree determination, it is possible to determine the occurrence of an out-of-focus state due to blurring and more suitably determine whether a captured image is suitable as an inspection image. A situation in which a camera is mounted on a flying object such as a drone and image capturing is performed can be given as an example in which blurring occurs despite the focus being aligned. In this case, the drone may shake due to the wind or the like at the time of image capturing, and blurring may occur.

In step S510, the CPU 101 determines that the captured image currently being processed is an "OK image" (can be used for image inspection), which does not need to be recaptured. Then, in step S512, the captured image determined to be an OK image is moved into the "OK directory" created in step S303.

In step S511, the CPU 101 determines that the captured image currently being processed is an "NG image" (cannot be used for image inspection), which need to be recaptured. Then, in step S513, the captured image determined to be an NG image is moved into the "NG directory" created in step S303.

In step S514, the CPU 101 generates a determination result image, on which an image quality determination result has been superimposed, using the information of results of determination in image capturing resolution determination (step S502), focus degree determination (step S506), and blur determination (step S509) and stores the determination result image in the HDD 104. The determination result image to be generated will be described later with reference to FIGS. 9A to 9C.

In FIG. 5, an example in which processing is performed in the order of image capturing resolution determination, focus degree determination, and blur determination has been described, but they may be performed in a different order. However, by performing them in the order of FIG. 5, the effect of reducing processing load is obtained. That is, regarding processing loads of the three determinations, the image capturing resolution determination is relatively small and the blur determination is relatively large. Therefore, by performing the determinations in order from the smallest processing load, it is possible to reduce the number of captured images for which determination processing with a large processing load is performed and thereby reduce the overall processing load.

<GUI Display of Image Quality Determination Result>

Figure 6:
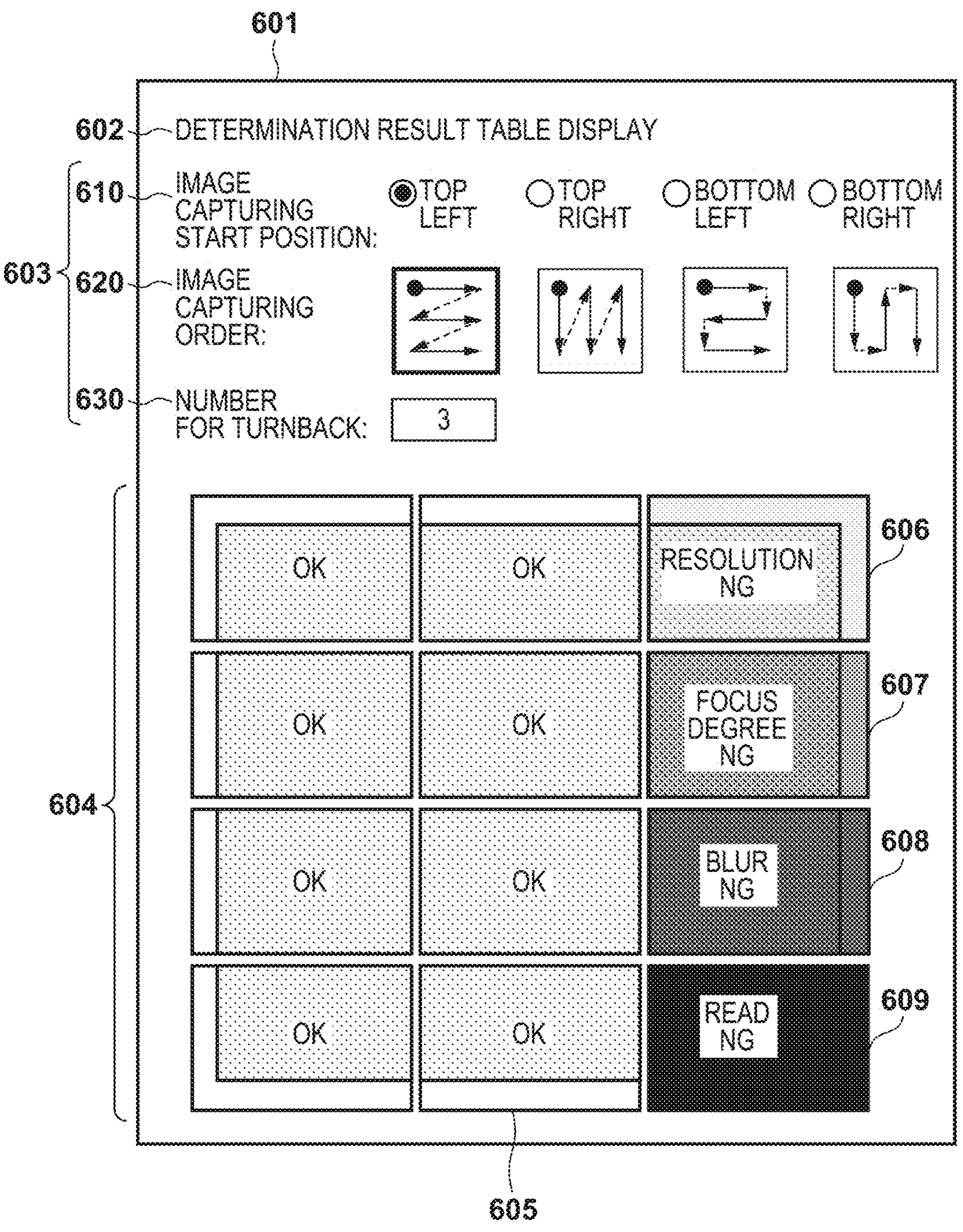
FIG. 6 is a diagram illustrating a GUI screen for an image quality determination result.

FIG. 6 is a diagram illustrating a graphical user interface (GUI) screen of an image quality determination result. That is, it illustrates an example of display of a table of results of determination in step S208 of FIG. 2.

A screen 601, which is a display of a table of determination results, is a screen to be displayed on a PC, a smart phone, a tablet terminal, or the like. The screen 601 is constituted by a title display portion 602, an image capturing control setting portion 603, and a determination result display portion 604. The image capturing control setting portion 603 includes three portions: an image capturing start position setting portion 610, an image capturing order setting portion 620, and a turnback number setting portion 630.

The image capturing start position setting portion 610 is a UI component for selecting an image capturing start position using a radio button. Here, an example in which four positions, which are "top left", "top right", "bottom left", and "bottom right" of the structure 300, are displayed so as to be selectable as the image capturing start position is illustrated.

The image capturing order setting portion 620 is a UI component for selecting an image capturing direction movement pattern by using, for example, a mouse click. Here, an example in which four movement patterns, which are "horizontal/one direction", "vertical/one direction", "horizontal/snake", and "vertical/snake", are displayed so as to be selectable is illustrated. The turnback number setting portion 630 is a UI component for receiving designation of the number for turnback. Here, an example in which input of an integer value from the user is received is illustrated. As described above, in a case of repeating horizontal image capturing, the number for turnback is the number of times of image capturing for each row. In the case of repeating vertical image capturing, it is the number of times of image capturing for each column.

The determination result display portion 604 is a display region in which determination results for a plurality of captured images are arranged and displayed in a tiled manner. The arrangement is set based on information at the time of image capturing set in the image capturing control setting portion 603.

A configuration may be such that, when the screen 601 is displayed, the information at the time of image capturing stored in step S401 is set as default values in the image capturing control setting portion 603. Alternatively, setting input may be received according to a mouse operation, a touch operation, a keyboard operation, or the like from the user via the operation unit 106. It is possible to control the arrangement of determination result images in the determination result display portion 604 based on settings in the image capturing control setting portion 603.

The screen 601 indicates an example of captured images obtained when image capturing control similar to that of FIGS. 3A and 3B is performed. Specifically, an example in which "top left" is selected as the image capturing start position, "horizontal/one direction" is selected as the image capturing order, and "3" is set as the number for turnback is indicated.

FIG. 7 is a diagram illustrating an example of an image capturing order panel defined by settings for the image capturing start position and the image capturing order. Four panels of a corresponding row are displayed as selection candidates in the image capturing order setting portion 620 according to the image capturing start position selected in the image capturing start position setting portion 610. For example, "top left" is selected as the image capturing start position in FIG. 6, and so, four panels of a row corresponding to "top left" of FIG. 7 are displayed. As described above, the display of the image capturing order setting portion 620 is appropriately switched according to the setting of the image capturing start position setting portion 610. Therefore, by simply selecting two settings, the user can designate one pattern from a total of 16 movement patterns.

In the turnback number setting portion 630, the number of images to be captured per row (or column) until image capturing moves to the next row (or column) is inputted. For example, in FIG. 6, "3" is inputted as the number for turnback as calculated in step S401.

In the determination result display portion 604, display is performed in an emphasized manner by superimposing the determination results stored in the HDD 104 in step S514 on respective captured images as character string images. For example, characters "OK" are displayed in a superimposed manner on an image 605 of FIG. 6, and thereby, the user can easily ascertain that the image quality determination result is OK. Similarly, characters "resolution NG" are displayed in a superimposed manner on an image 606, and thereby, the user can easily ascertain that the image quality determination result is NG due to the resolution being less than or equal to the threshold. Further, characters "focus degree NG" are displayed in a superimposed manner on an image 607, and thereby, the user can easily ascertain that the image quality determination result is NG due to the degree of focus being less than or equal to the threshold. Further, characters "blur NG" are displayed in a superimposed manner on an image 608, and thereby, the user can easily ascertain that the image quality determination result is NG due to the frequency component being less than the threshold and blurring being suspected to have occurred.

Further, in the determination result display portion 604, display is performed in an emphasized manner by filling each captured image with (by displaying) a color image corresponding to their respective determination result (in a superimposed manner using transparent processing). For example, the image 606 is composited with a "light gray image" corresponding to resolution NG, the image 607 is composited with a "dark gray image" corresponding to focus degree NG, and the image 608 is composited with a "black image" corresponding to blur NG, each at a 50% transparency. With these emphasized displays, the user can more easily ascertain the reason why a respective captured image is NG (reason why image recapturing is necessary). Compositing here is different from the compositing described previously and is processing for adding an image effect to a captured image, such as transparent processing. That is, this compositing is processing to be performed on one captured image. This compositing, like superimposition of a character string described above, may be processing for superimposing information that is not information captured in a captured image. Further, this compositing, in addition to addition of an image effect, may be processing for performing processing for superimposing information that is not information captured in a captured image.

Further, in the determination result display portion 604, each captured image is arranged based on the settings (i.e., image capturing order at the time of image capturing) in the image capturing control setting portion 603. Therefore, the user can easily ascertain the image capturing position (image capturing range) of each captured image in the structure 300. With this, the user can perform image recapturing or set thresholds more appropriately.

Further, characters "read NG" are displayed in a superimposed manner on an image 609. This indicates a case where an image fails to be read due to it being an improper image file (defective captured image that cannot be displayed) or the like. In this case, a black image is generated as the dummy image 609 and characters "read NG" are displayed in a superimposed manner. The dummy image 609 is displayed in order to prevent the overall image of the structure 400 from being displayed in a disrupted manner due to a shift in arrangement of captured images that have been captured thereafter occurring in the determination result display portion 604. That is, by displaying the dummy image 609, it is possible to display the overall image of the structure 400 without disruption. In addition, the user can easily ascertain that it is not that an image quality determination result is NG but that image reading itself has failed.

In the display of the determination result display portion 604, it is excessive to perform display processing for displaying individual captured images at their original resolution, and so, the images may be displayed after performing in advance processing for reducing the images. By doing so, even when a large number of images are arranged, it is possible to switch the arrangement of the display at a high speed according to the selections of the image capturing control setting portion 603.

<Determination Parameter Setting in Image Quality Determination Processing>

Figure 8:
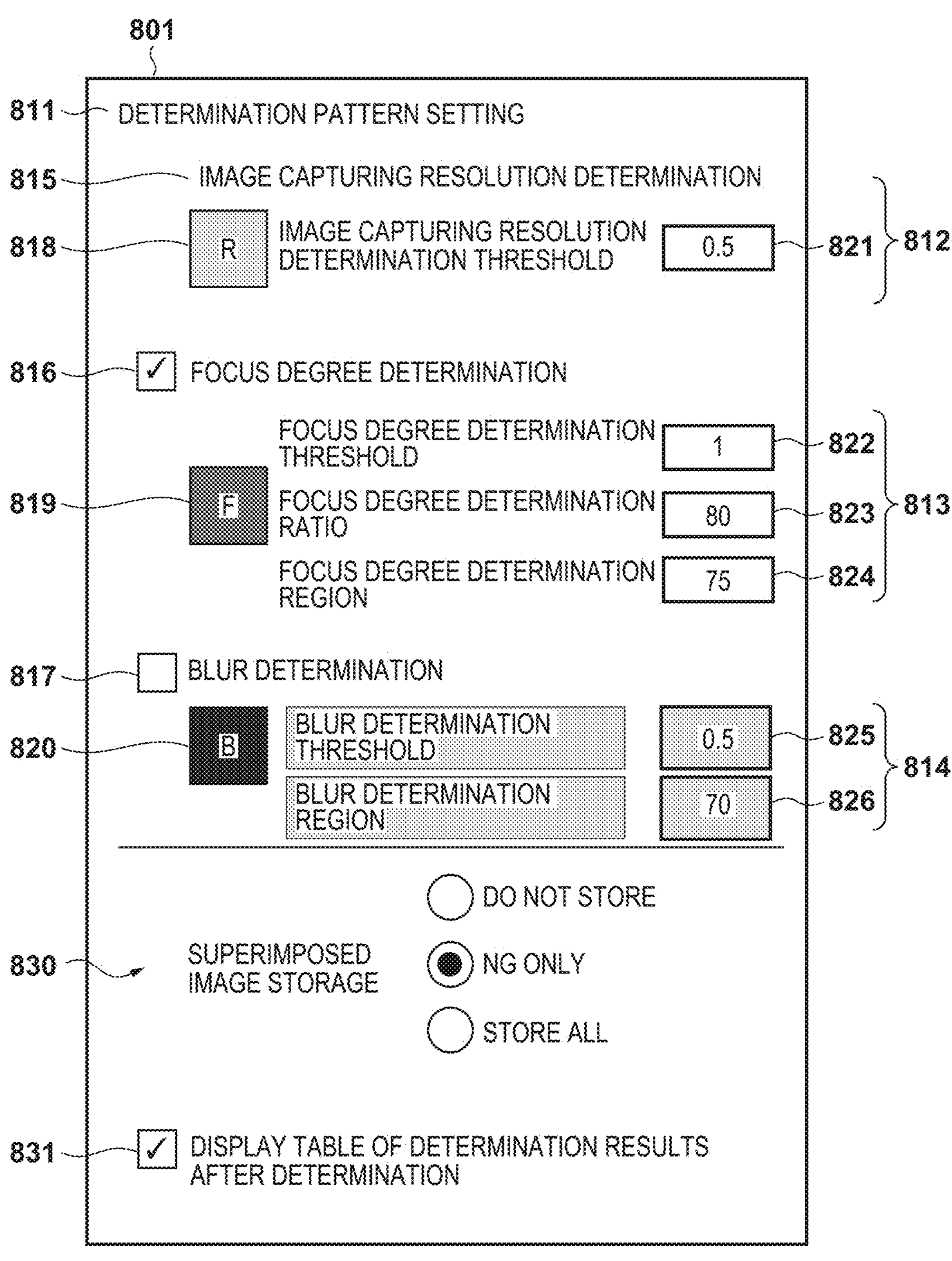
FIG. 8 is a diagram illustrating an example of a GUI screen for setting determination parameters.

FIG. 8 is a diagram illustrating a GUI screen for setting determination parameters in the image quality determination processing. That is, it is a GUI screen for performing settings related to "image capturing resolution determination", "focus degree determination", and "blur determination" in the image quality determination processing (step S205). Further, here, settings as to whether to generate and store a superimposed image to be described later and whether to display a table of image quality determination results are also performed.

A setting screen 801 is constituted by UI components 811 to 826 related to determination pattern settings, a superimposed image storage setting portion 830, and a table display setting portion 831. In the UI components 811 to 826 related to determination pattern settings, settings related to roughly three determinations (image capturing resolution determination, focus degree determination, and blur determination) are performed. The superimposed image storage setting portion 830 is a UI component for receiving designation as to whether to store a superimposed image (captured image on which determination result characters are superimposed) such as the images 605 to 608 illustrated in FIG. 6. The table display setting portion 831 is a UI component for receiving designation as to whether to perform determination result table display in step S208.

The determination name labels 815, 816, and 817 are label displays corresponding to image capturing resolution determination, focus degree determination, and blur determination. Checkboxes are arranged for the determination name labels 816 and 817, and when the user checks a checkbox, corresponding determination processing is performed. For example, in the setting screen 801 of FIG. 8, a state in which execution of image capturing resolution determination and focus degree determination is designated and non-execution is designated for blur determination is indicated. Although it is assumed here that image capturing resolution determination is always executed, a configuration may be taken as to similarly provide a checkbox and allow designation of non-execution.

The determination symbols 818, 819, and 820 are symbol displays (icons) corresponding to image capturing resolution determination, focus degree determination, and blur determination. The input regions 812, 813, and 814 are input regions for receiving designation of thresholds corresponding to image capturing resolution determination, focus degree determination, and blur determination. In the setting screen 801 of FIG. 8, it is indicated that non-execution is designated for blur determination, and so, the input region 814 is in a state that is grayed out and input cannot be made. With this, the user can focus solely on inputting numerical values related to the determinations to be performed. By such UI components being arranged and displayed, the user can intuitively ascertain to which determination processing an input region is related. In addition, according to the order of arrangement of settings related to three determinations (image capturing resolution determination, focus degree determination, and blur determination) on the setting screen 801, the user can intuitively ascertain that the three determinations are performed in that order of arrangement.

The setting screen 801 is a screen to be displayed on a PC, a smartphone, a tablet terminal, or the like, and receives setting input via a mouse operation, a touch operation, a keyboard operation, or the like from the user via the operation unit 106.

The CPU 101 determines whether to continue processing in steps S503 and S507 based on a state of the determination name labels 816 and 817 for focus degree determination and blur determination. With this, in a situation in which subsequent determination processing (focus degree determination and blur determination) is not necessary, the subsequent processing can be omitted. For example, it is possible to perform blur determined at the time of an image capturing form in which a drone with which blur is likely to occur is used and not perform blur determination at the time of an image capturing form in which a tripod with which blur is unlikely to occur is used. In addition, in the case of performing only image capturing resolution determination, both checkboxes of focus degree determination and blur determination are unchecked. With such a setting, in the case of performing determination processing on a large amount of captured images, the processing can be aborted according to the application and purpose, and effects such as reduction of processing time can be expected.

A value to be inputted to the input region 821 represents a threshold for resolution to be used in the determination processing of step S502. A value to be inputted to the input region 822 represents a threshold for a defocus value to be used in the determination processing of step S505. A value to be inputted to the input region 823 represents a threshold for a surface area ratio to be used in the determination processing of step S506. A value to be inputted to the input region 824 is for setting a target range for calculating a surface area ratio in step S506. Specifically, a percentage for a surface area of a target range to be a determination target for when the entire captured image to be processed is assumed to be 100% is represented. For example, when "75" is designated in the input region 824, the determination target is a region accounting for 75% that is located in a central portion of the captured image (that is, region accounting for 25% that is located in a peripheral portion is excluded). By reducing the determination target (decreasing the surface area), the amount of calculation processing decreases, and improvement in processing speed is expected.

Further, by setting the value to be inputted to the input region 824 to be less than “100” (e.g., “50”), when creating a composite image (stitch image), only the central portion of an image to be included in the composite image can be set as a determination target. That is, a peripheral portion of a captured image to be a margin can be removed from being a determination target, and thereby, it is possible to determine that the captured image can be used in stitch compositing even when the peripheral portion is out of focus.

A value to be inputted to the input region 825 represents a threshold for a frequency component value to be used in the determination processing of step S509. A value to be inputted to the input region 826 is for setting a target range for calculating a frequency component value in step S509. Specifically, a percentage for a surface area of a target range to be a determination target for when the entire captured image to be processed is assumed to be 100% is represented. In addition to the effect as in the case of the input region 824 (target region of focus degree determination) described above, in blur determination, it is possible to obtain an effect of suppressing high-frequency components, which is caused by an object that is not an image inspection target (e.g., plants) being imaged in the background of the image (behind the structure).

The superimposed image storage setting portion 830 is a UI component for receiving designation as to whether to store a superimposed image. The superimposed images to be generated may be images such as the images 605 to 608 or images illustrated in FIGS. 9A to 9C to be described later. In the first embodiment, an example in which a superimposed image is generated and stored regardless of whether a determination result is OK or NG has been described, but a superimposed image may be generated only for a target determined to be NG. Further, by creating a list of determination results, it is possible to not generate superimposed images and thus aim to reduce processing time.

Figure 9A:
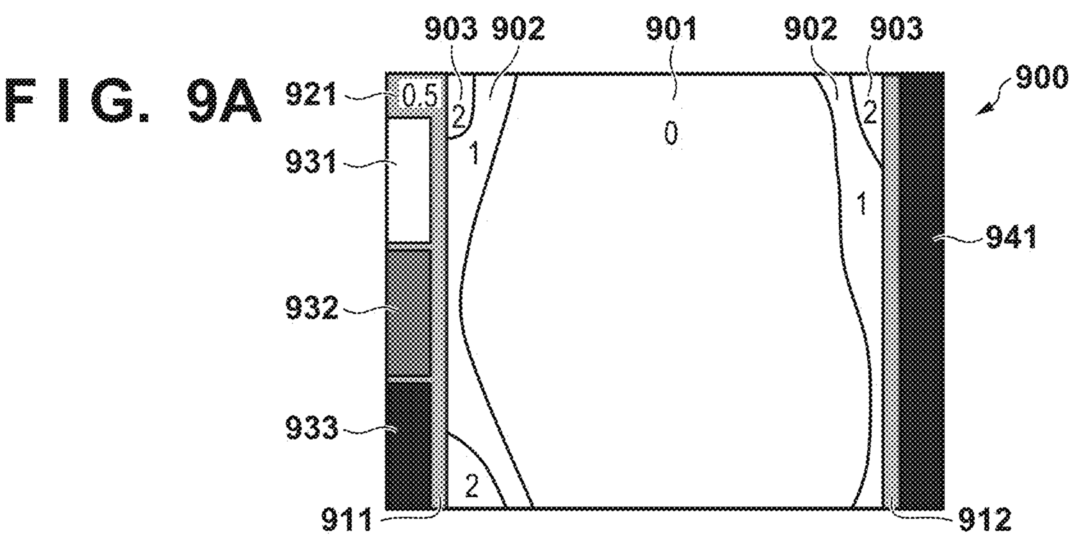
FIGS. 9A to 9C are diagrams illustrating other examples of a superimposed image.
Figure 9B:
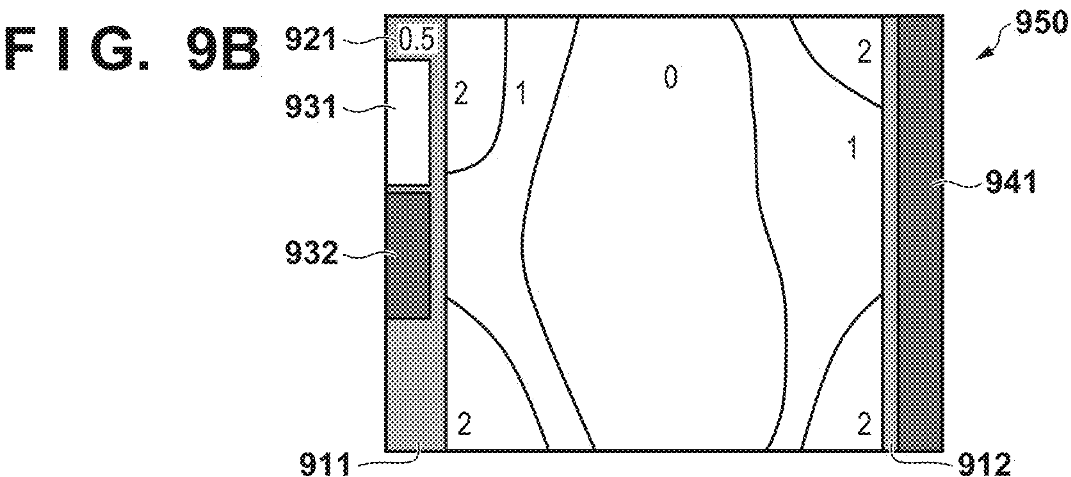
Figure 9C:
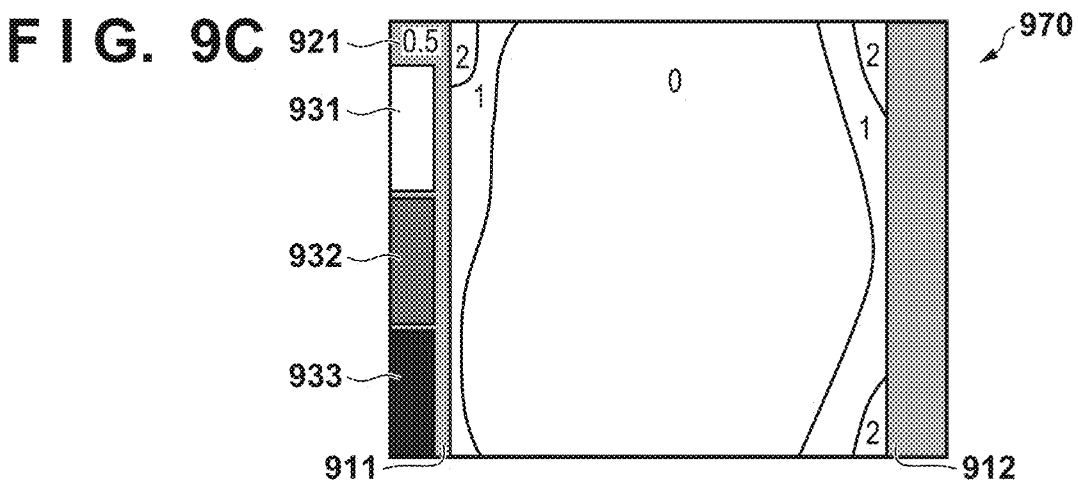

When “NG only” is selected in the superimposed image storage setting portion 830, an image such as those illustrated in FIGS. 9A to 9C on which an image quality determination result has been superimposed is stored together with a captured image in the “NG directory”. Further, when “store all” is selected, an image such as those illustrated in FIGS. 9A to 9C on which an image quality determination result has been superimposed is stored together with a captured image in a respective one of the “OK directory” and the “NG directory”. By adopting such a setting, it becomes possible to aim to reduce processing time while generating only necessary images that meets the demands of the user.

FIGS. 9A to 9C are diagrams illustrating another example of a superimposed image on which a determination result has been superimposed. The images illustrated in FIGS. 9A to 9C are detailed information to be displayed when the user selects one image arranged in the determination result display portion 604 in the display of a table of determination results of FIG. 6 (e.g., click operation or touch operation is received) and is referred to as a result image. The result image can be displayed on a separate screen from the screen 601.

FIG. 9A is a result image 900 of a captured image determined to be NG in blur determination and is displayed when the image 608 is selected. FIG. 9B is a result image 950 of a captured image determined to be NG in focus degree determination and is displayed when the image 607 is selected. FIG. 9C is a result image 970 of a captured image not determined to be NG and determined to be OK in all three determinations (image capturing resolution determination, focus degree determination, and blur determination) and is displayed when the image 605 is selected.

The result image 900 is constituted by defocus regions 901 to 903 and frame regions 911 to 912. The defocus region 901 indicates a region in which the defocus amount is “0” (region in focus), the defocus regions 902 indicate regions in which the defocus amount is “1”, and the defocus regions 903 indicate regions in which the defocus amount is “2”. A different color (e.g., JIS Safety Color) may be displayed in a superimposed manner for each defocus region. For example, blue or green indicating safety may be employed in a region in which the defocus amount is smaller than a predetermined value, and yellow or red indicating a warning may be employed in a region in which the defocus amount is greater than or equal to the predetermined value. This makes it easier for the user to visually recognize a region in which the defocus amount is large and for which image recapturing is necessary.

The left frame region 911 is a region in which an executed determination among the three determinations (image capturing resolution determination, focus degree determination, and blur determination) is displayed. Here, since all three determinations have been performed, a display region 931 for displaying that image capturing resolution determination has been performed, a display region 932 for displaying that focus degree determination has been performed, and a display region 933 for displaying that blur determination has been performed are included. The display regions 931 to 933 are each displayed in a different color. Here, for example, the display region 931 is displayed in “light gray” indicating resolution determination, the display region 932 is displayed in “dark gray” indicating focus degree determination, and the display region 933 is displayed in “black” indicating blur determination so as to correspond with FIG. 6. In addition, a value “0.5” of the image capturing resolution obtained in step S501 is also displayed in a display region 921.

Meanwhile, the right frame region 912 is a region for displaying the type of determination for which an NG determination has been made. Since the result image 900 is a captured image that has been deemed NG in blur determination, the display region 941 is displayed in “black”, which indicates blur determination, so as to indicate that an NG determination has been made in blur determination. That is, it is indicated in the same color as the display region 933. With this display, the user can intuitively ascertain in which determination processing it has been deemed NG.

The result image 950 corresponds to a captured image determined to be NG in focus degree determination and so, image capturing resolution determination and focus degree determination have been performed, but blur determination has not been performed (due to it being No in step S506). Therefore, in the left frame region 911 of the result image 950, two regions, which are the display region 931 for displaying that image capturing resolution determination has been performed and the display region 932 for displaying that focus degree determination has been performed, are displayed. In addition, a value “0.5” of the image capturing resolution obtained in step S501 is also displayed in the display region 921. Meanwhile, the display region 941 of the right frame region 912 is displayed in “dark gray” indicating focus degree determination so as to indicate that it has been determined to be NG in focus degree determination. That is, it is indicated in the same color as the display region 932.

The result image 970 corresponds to a captured image not determined to be NG and determined to be OK in all three determinations. Therefore, in the left frame region 911 of the result image 970, three regions, which are the display region 931 for displaying that image capturing resolution determination has been performed, the display region 932 for displaying that focus degree determination has been performed, and the display region 933 for displaying that blur determination has been performed, are displayed. In addition, a value "0.5" of the image capturing resolution obtained in step S501 is also displayed in the display region 921. Meanwhile, the display region 941 (unlike the result images 900 and 950) is not displayed in the right frame region 912 of the result image 970.

Although not illustrated, if it is deemed NG in image capturing resolution determination, the display region 931 displaying that the image capturing resolution determination has been performed is displayed in the left frame region 911. Further, a value exceeding a resolution threshold (e.g., "1.5") is displayed in the display region 921. In addition, in the right frame region 912, a "light gray" display region 941 indicating image capturing resolution determination is displayed so as to indicate that it has been determined to be NG in image capturing resolution determination.

With such result images, the user can intuitively confirm the information of the image capturing resolution, the type of determination performed, and the type of determination in which it has been deemed NG.

As described above, a result image illustrated in FIGS. 9A to 9C can be displayed on a screen (window) different from the screen 601 when the user selects one image disposed in the determination result display portion 604 of the screen 601. With this, the user can analyze the cause of the determination result being NG based on the result image. For example, when the "focus degree NG" image 607 is selected in the screen 601, the result image 950 is displayed. With this, the user can confirm the defocus regions 901 to 903 in the result image 950 and thereby analyze the cause of focus degree NG. Similarly, when the "resolution NG" image 606 is selected on the screen 601, a corresponding result image (not illustrated) is displayed, and the user can confirm the value of the image capturing resolution displayed in the display region 921.

As described above, according to the first embodiment, the image quality is determined for each of a plurality of captured images obtained by imaging an image capturing target object (structure) by partial region is performed. Then, a plurality of captured images on which determination results are displayed in a superimposed manner are arranged and displayed so as to substantially correspond to their positions in the structure. With this, the user can more appropriately ascertain the states of a plurality of captured images. For example, it is possible to easily ascertain to which partial region of the structure a captured image that does not satisfy the required quality corresponds.

First Variation

In a first variation, another embodiment of table display (step S208) will be described. Specifically, a form in which only images determined to be NG are displayed in a table will be described.

FIG. 10 is a flowchart for explaining the operation of the information processing apparatus in the first variation. FIG. 10 is that in which part of the processing of the first embodiment (FIG. 2) has been replaced with another processing. Since the processing from step S201 to step S207 of FIG. 10 is similar processing to the processing described in the first embodiment (FIG. 2), the description thereof will be omitted.

In step S1001, the CPU 101 displays, on the display unit 105, a table of only the captured images determined to be NG according to the determination processing.

Figure 11:
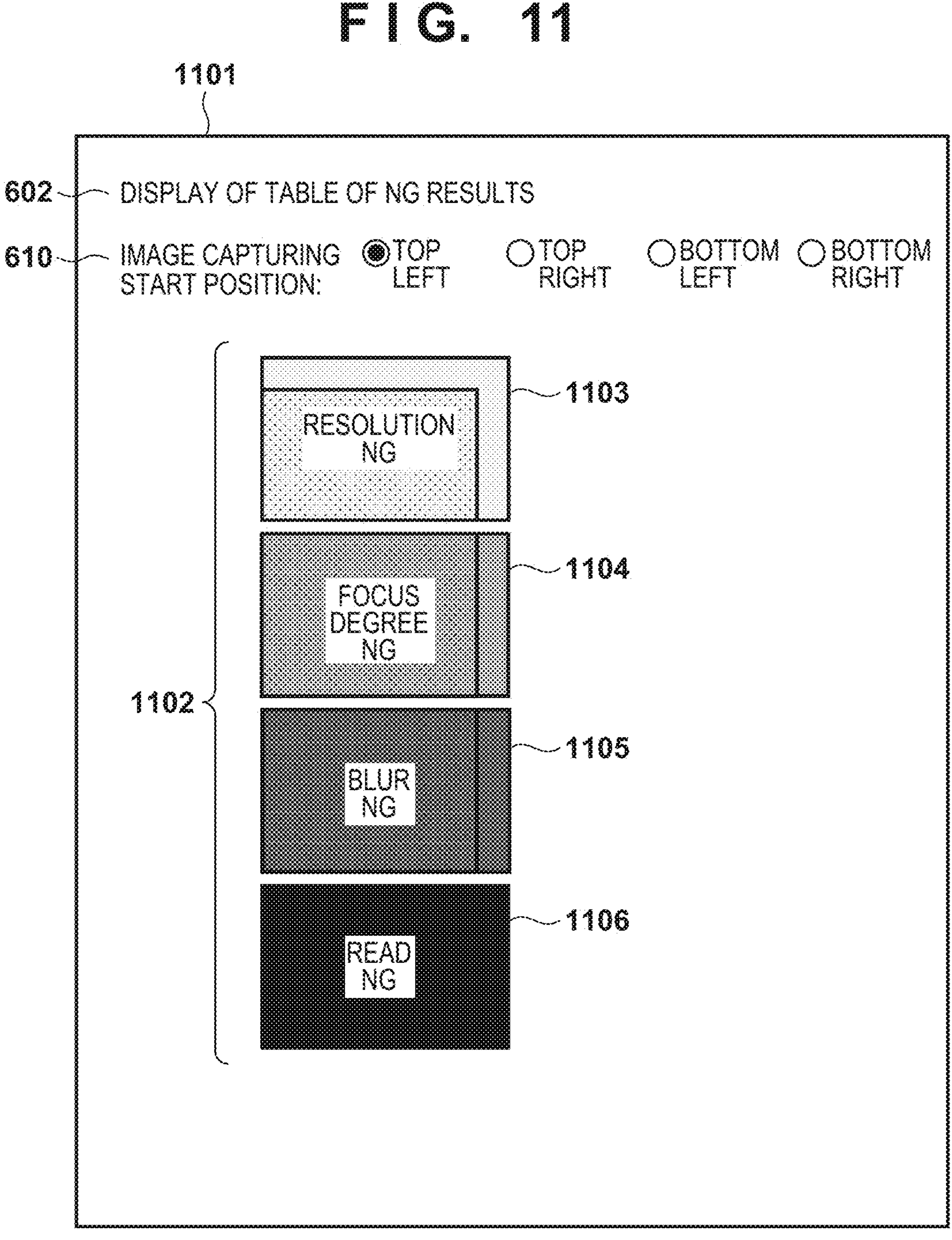
FIG. 11 is a diagram illustrating an example of displaying a table of NG results.

FIG. 11 is a diagram illustrating an example of display of a table of captured images determined to be NG. A screen 1101 of FIG. 11 is that in which a part of the screen 601 of FIG. 6 has been replaced.

The screen 1101 is constituted by the title display portion 602, the image capturing control setting portion 603, and a determination result display portion 1102. In the image capturing control setting portion 603, only the image capturing start position setting portion 610 is arranged. In the determination result display portion 1102, only the captured images determined to be NG are displayed. In the determination result display portion 1102 of FIG. 11, a "resolution NG" image 1103, a "focus degree NG" image 1104, a "blur NG" image 1105, and a "read NG" image 1106 are indicated. Similarly to the images 606 to 609 of FIG. 6, the reason (type of determination) for being determined to be NG is displayed in a superimposed manner on each image.

By displaying only the captured images determined to be NG in the display of a table of determination results as in the screen 1101, there is an advantage that, when there is a problem common to these captured images, the user can easily identify that problem.

Second Variation

In a second variation, an embodiment in which a display timing at which table is displayed (step S208) is changed will be described. In the first embodiment, the image capturing condition determination processing (step S203) and the image quality determination processing (step S205) are performed after image capturing of an image capturing target object (structure) has been completed, but the second variation mainly differs in that these determination processes are performed in parallel with the image capturing processing.

FIG. 12 is a flowchart for explaining the operation of the information processing apparatus in the second variation. FIG. 12 is that in which part of the processing of the first embodiment (FIG. 2) has been replaced with another processing. Since the processing from step S201 to step S205 of FIG. 12 is similar processing to the processing described in the first embodiment (FIG. 2), the description thereof will be omitted.

In step S1201, the CPU 101 displays a table of determination results on the display unit 105. Similarly to the first embodiment (step S208), in the display of a table of determination results, display is performed such that the user can easily ascertain a position of a captured image that needs to be recaptured that is relative to a structure. In addition, the reason why image recapturing is necessary is presented to the user based on the results of determining the image capturing condition and the image quality stored in steps S203 and S205. However, in the second variation, table display is performed for the captured images obtained by a point in time of table display. That is, in an N-th loop in loop processing (step S201 to step S1202), N captured images are displayed.

In step S1202, the CPU 101 determines whether the image capturing processing (step S201) and the determination processing (step S203, step S205) of all of a plurality of partial regions (FIG. 3A) of the image capturing target object (structure) have been completed. If completed (Yes), the flow ends, and if not completed (No), the processing transitions to step S201. In the case of transitioning to step S201, a partial region that has not been imaged is selected.

As described above, these determination processes are performed in parallel with the image capturing processing and the table display is sequentially updated each time the image capturing processing and the determination processes of one partial region are finished. With this, when there is a problem in the captured image, the user can immediately notice the problem. Further, there is an advantage that when there is a problem common to captured images, the user can easily identify that problem.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-137401, filed Aug. 25, 2023 which is hereby incorporated by reference herein in its entirety.

What is claimed is:

1. An information processing apparatus comprising:

one or more memories storing instructions; and one or more processors executing the instructions to:

obtain a plurality of captured images in which an image capturing target object is captured, the plurality of captured images respectively corresponding to partial regions of the image capturing target object;

cause a display unit to display the plurality of captured images in a display form that corresponds to a determination result of an image quality of each of the plurality of captured images, the plurality of captured images being arranged in the display unit as a plurality of tiles in a two-dimensional array having a row direction and a column direction, wherein an arrangement among the plurality of captured images in the two-dimensional array corresponds to a relative positional relationship among the partial regions of the image capturing target object such that (i) captured images corresponding to partial regions that are adjacent on the image capturing target object are displayed as tiles that are adjacent in the two-dimensional array, and (ii) captured images corresponding to partial regions that are separated on the image capturing target object are displayed as tiles that are separated in the two-dimensional array; and receive a setting of the arrangement of the plurality of captured images in the display unit, wherein in the setting, designation of an image capturing start position of the image capturing target object is received and designation of an image capturing order of the image capturing target object is received, and the arrangement in the display unit is determined based on the designated image capturing start position and the designated image capturing order.

2. The information processing apparatus according to claim 1, wherein in a case where a defective captured image that cannot be displayed is included in the plurality of captured images, a dummy image is displayed in place of that defective captured image.

3. The information processing apparatus according to claim 1, wherein a determination result image indicating a respective determination result is displayed in a superimposed manner on each of the plurality of captured images.

4. The information processing apparatus according to claim 3, wherein an image quality is determined using a plurality of determination processes that are different from each other.

5. The information processing apparatus according to claim 4, wherein the plurality of determination processes include:

first determination processing related to an image capturing resolution in a captured image, second determination processing related to a degree of focus in a captured image, and third determination processing related to a degree of blur occurring in a captured image.

6. The information processing apparatus according to claim 4, wherein the determination result image is a character string image and/or a color image indicating a determination result according to at least one of the plurality of determination processes.

7. The information processing apparatus according to claim 1, wherein the plurality of captured images are captured images obtained by imaging partial regions of the image capturing target object by causing sequential movement to be performed along a given movement pattern, and the plurality of captured images are arranged based on an image capturing start position for when the plurality of captured images were captured and the given movement pattern.

8. The information processing apparatus according to claim 1, wherein in the setting, designation of the number of captured images to be arranged in a row direction or the number of captured images to be arranged in a column direction for the plurality of captured images to be two-dimensionally arranged along the row direction and the column direction, which are orthogonal to each other, is received.

9. The information processing apparatus according to claim 1, wherein in the setting, selection of one captured image included in the plurality of captured images arranged and displayed on the display unit is received, and in a case where selection of a captured image is received, detailed information related to the determination result corresponding to that captured image for which selection has been received is further displayed.

10. The information processing apparatus according to claim 9, wherein the detailed information includes information related to one or more determination processes used to derive the determination result corresponding to the captured image for which selection has been received and/or a defocus map corresponding to the captured image for which selection has been received.

11. The information processing apparatus according to claim 1, wherein the arrangement is set such that captured images corresponding to partial regions that share a boundary on the image capturing target object are displayed adjacent to each other with no other captured image disposed between them in the display unit.

12. The information processing apparatus according to claim 1, wherein, in the setting, the one or more processors further receive designation of a turnback number indicating a number of captured images to be arranged before changing to a next row or a next column, and determine the arrangement based on the turnback number.

13. The information processing apparatus according to claim 1, wherein the one or more processors determine the arrangement by assigning each captured image an index pair (r, c) in a two-dimensional grid based on the image capturing start position and the image capturing order, and arranging the captured images in the display unit according to the index pairs.

14. A method of controlling an information processing apparatus, the method comprising:

obtaining a plurality of captured images in which an image capturing target object is captured, the plurality of captured images respectively corresponding to partial regions of the image capturing target object; and performing display control so as to cause a display unit to display the plurality of captured images in a display form that corresponds to a determination result of an image quality of each of the plurality of captured images, the plurality of captured images being arranged in the display unit as a plurality of tiles in a two-dimensional array having a row direction and a column direction, wherein an arrangement among the plurality of captured images in the two-dimensional array corresponds to a relative positional relationship among the partial regions of the image capturing target object such that (i) captured images corresponding to partial regions that are adjacent on the image capturing target object are displayed as tiles that are adjacent in the two-dimensional array, and (ii) captured images corresponding to partial regions that are separated on the image capturing target object are displayed as tiles that are separated in the two-dimensional array; and receiving a setting of the arrangement of the plurality of captured images in the display unit, wherein in the display control, designation of an image capturing start position of the image capturing target object is received and designation of an image capturing order of the image capturing target object is received, and the arrangement in the display unit is determined based on the designated image capturing start position and the designated image capturing order.

15. A non-transitory computer-readable recording medium storing a program that, when executed by a computer, causes the computer to perform a method of controlling an information processing apparatus, the method comprising:

obtaining a plurality of captured images in which an image capturing target object is captured, the plurality of captured images respectively corresponding to partial regions of the image capturing target object; and performing display control so as to cause a display unit to display the plurality of captured images in a display form that corresponds to a determination result of an image quality of each of the plurality of captured images, the plurality of captured images being arranged in the display unit as a plurality of tiles in a two-dimensional array having a row direction and a column direction, wherein an arrangement among the plurality of captured images in the two-dimensional array corresponds to a relative positional relationship among the partial regions of the image capturing target object such that (i) captured images corresponding to partial regions that are adjacent on the image capturing target object are displayed as tiles that are adjacent in the two-dimensional array, and (ii) captured images corresponding to partial regions that are separated on the image capturing target object are displayed as tiles that are separated in the two-dimensional array; and receiving a setting of the arrangement of the plurality of captured images in the display unit, wherein in the display control, designation of an image capturing start position of the image capturing target object is received and designation of an image capturing order of the image capturing target object is received, and the arrangement in the display unit is determined based on the designated image capturing start position and the designated image capturing order.

* * * * *